(12) United States Patent
Kim et al.

(10) Patent No.: US 8,339,491 B2
(45) Date of Patent: Dec. 25, 2012

(54) IMAGE SENSOR MODULE EMBEDDED IN MOBILE PHONE AND METHOD OF MANUFACTURING THE SAME

(75) Inventors: Young Shin Kim, Seoul (KR); Seung Jae Yeom, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 936 days.

(21) Appl. No.: 12/285,783

(22) Filed: Oct. 14, 2008

(65) Prior Publication Data
US 2010/0013968 A1    Jan. 21, 2010

(30) Foreign Application Priority Data
Jul. 21, 2008   (KR) .................. 10-2008-0070562

(51) Int. Cl.
*H04N 3/14*    (2006.01)

(52) U.S. Cl. ........................................... 348/294
(58) Field of Classification Search ............... 348/294
See application file for complete search history.

(56) References Cited

U.S. PATENT DOCUMENTS

| 6,157,072 | A | * | 12/2000 | Nakayama et al. ........... 257/443 |
| 7,755,694 | B2 | * | 7/2010 | Tseng ............................ 348/340 |
| 2007/0126899 | A1 | * | 6/2007 | Kim .............................. 348/294 |
| 2007/0236596 | A1 | * | 10/2007 | Sekine et al. ................. 348/340 |
| 2008/0246868 | A1 | * | 10/2008 | Abe ............................... 348/308 |

* cited by examiner

*Primary Examiner* — Scott J Sugarman
*Assistant Examiner* — Vipin Patel

(57) ABSTRACT

An image sensor module embedded in a mobile phone and a method of manufacturing the same, in which a device is mounted on an image sensor chip such that it is connected to a component-mounting plating pattern formed on an upper surface of the image sensor chip, to miniaturize the resulting product.

12 Claims, 6 Drawing Sheets

Prior art

IMAGE SENSOR MODULE EMBEDDED IN MOBILE PHONE AND METHOD OF MANUFACTURING THE SAME

CROSS REFERENCE TO RELATED APPLICATION

This application claims the benefit of Korean Patent Application No. 10-2008-0070562, filed Jul. 21, 2008, entitled "IMAGE SENSOR MODULE EMBEDDED IN THE MOBILE AND MANUFACTURING METHOD THEREOF", which is hereby incorporated by reference in its entirety into this application.

BACKGROUND OF THE INVENTION

1. Field of the Invention

The present invention relates generally to an image sensor module embedded in a mobile phone and a method of manufacturing the same, and, more particularly, to an image sensor module embedded in a mobile phone and a method of manufacturing the same in which a drive integrated circuit, a multi-layer ceramic condenser or the like is mounted on an image sensor chip, so that the resulting product is miniaturized, thus enabling cost savings and enhancing product competitiveness.

2. Description of the Related Art

Mobile phones are in extensive use these days, and each unit incorporates an image sensor module so as to take a still image of a subject and then store or transmit the image data.

The image sensor module incorporated in mobile phones must include a drive integrated circuit and other peripheral chips as well as an image sensor chip therein, unlike other image sensor modules such as the LCC (Leadless Chip Carrier) type and the COB (Chip On Board) type image sensor modules which include only image sensor chips packaged therein. Accordingly, the manufacture of image sensor modules incorporated in mobile phones requires a technology form integrating a plurality of chips while reducing overall size and the height dimension of the modules.

Figure 1:
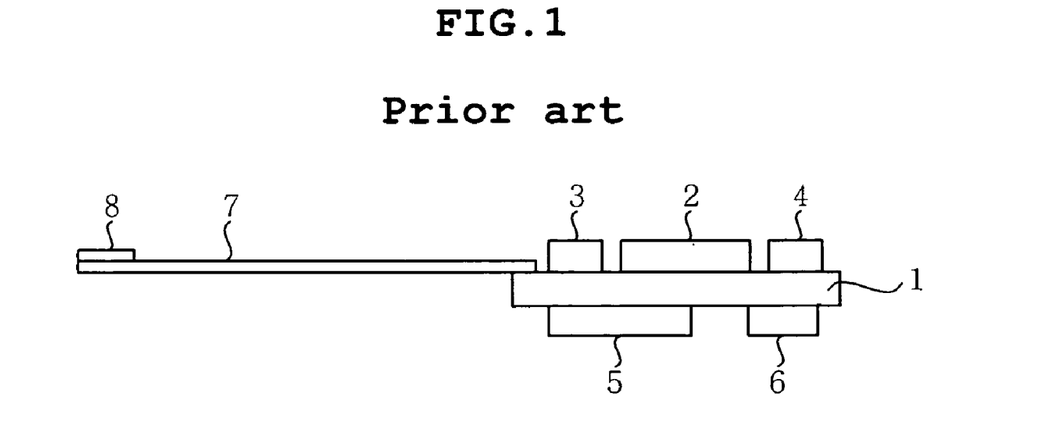
FIG. 1 is a side view schematically showing an example of an image sensor module embedded in a mobile phone.
Figure 2:
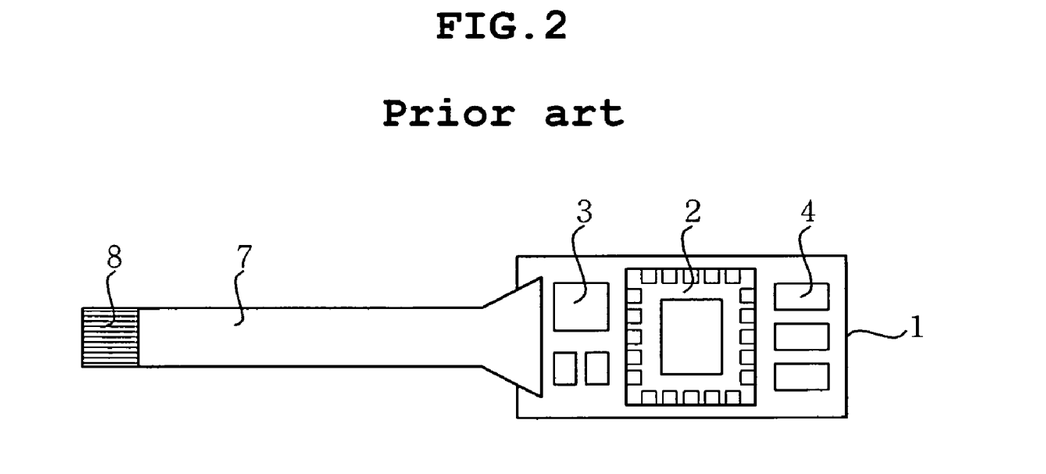
FIG. 2 is a plan view of FIG. 1.
Figure 3:
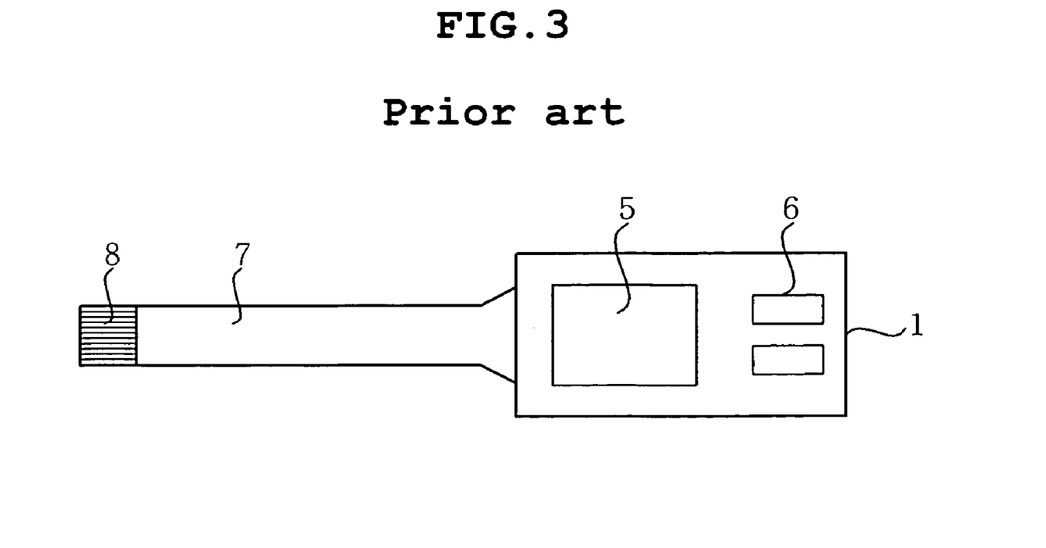
FIG. 3 is a bottom plan view of FIG. 1.

FIGS. 1 to 3 show an example of a conventional image sensor module embedded in a mobile phone.

A process of manufacturing the conventional image sensor module embedded in a mobile phone is now described with reference to the drawings. A printed circuit board 1, which is slightly larger than an image sensor chip, is prepared, and an image sensor chip 2, a drive integrated circuit 3, multi-layer ceramic condenser 4 and the like are mounted on the printed circuit board 1. The printed circuit board 1 further includes a memory chip 5 and peripheral chips 6 mounted on the bottom surface thereof.

To the end of the printed circuit board 1 on which the chips and the like are mounted, a flexible printed circuit 7 is connected using heat fusion. A connector 8 is connected to the other end of the flexible printed circuit 7 using a surface mount technology (SMT), thus preparing an image sensor module.

The image sensor module, which is prepared using the printed circuit board and a flexible printed circuit in this manner, is easily connected to a mobile phone via a connector.

However, in the conventional image sensor module embedded in a mobile phone, since the printed circuit board is connected to the flexible printed circuit by such a drastically small region using heat fusion, the connected region has a high susceptibility to mechanical shock and bending motions, and thus reliability in the connection region between the printed circuit board and the flexible printed circuit is low.

Furthermore, since the printed circuit board and the flexible printed circuit are separately prepared and then connected to each other, the number of processes is increased, and the manufacturing process is somewhat complicated.

Figure 4:
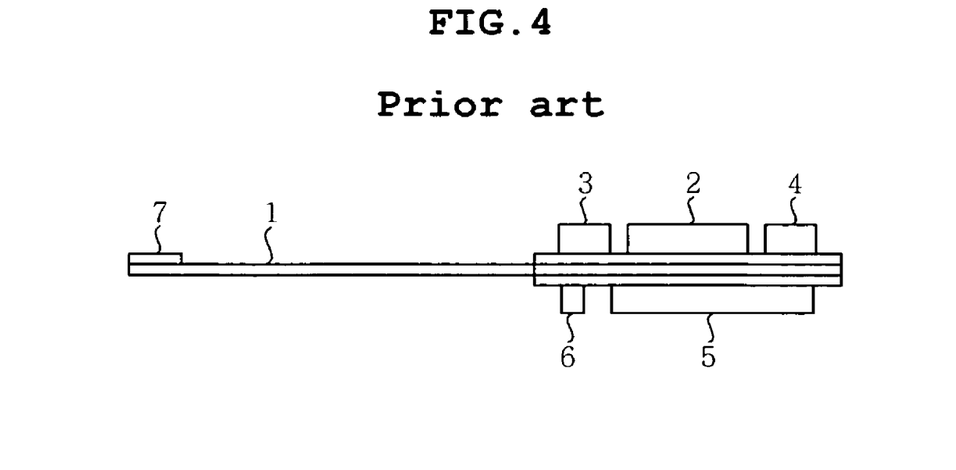
FIG. 4 is a side view schematically showing another example of an image sensor module embedded in a mobile phone.

FIG. 4 shows another example of a conventional image sensor module embedded in a mobile phone, which is devised to overcome the above problems occurring in the related art.

Referring to FIG. 4, in this example, a rigid-flexible printed circuit board 1 is prepared by integrating a rigid part having a high mechanical strength and a flexible part that is freely bendable, without separate production of the rigid printed circuit board and the flexible printed circuit. As in the previous example, an image sensor chip 2, a drive integrated circuit 3, a multi-layer ceramic condenser 4 and the like are mounted on the rigid part of the rigid-flexible printed circuit board 1, a memory chip 5 and peripheral chips are mounted on the bottom surface of the rigid-flexible printed circuit board 1, and a connector 7 is connected to an end of the flexible part of the rigid-flexible printed circuit board 1.

Since the above conventional image sensor module embedded in a mobile phone is configured such that an image sensor chip, a drive integrated circuit, a multi-layer ceramic condenser and the like are mounted on the printed circuit board, there is a need for a printed circuit board having a large area, thus making the miniaturization of the image sensor module embedded in a mobile phone troublesome.

SUMMARY OF THE INVENTION

Accordingly, the present invention has been made keeping in mind the above problems occurring in the prior art, and the present invention provides an image sensor module embedded in a mobile phone and a method of manufacturing the same, in which a drive integrated circuit, a multi-layer ceramic condenser and the like are mounted on an image sensor chip, so that the resulting product is miniaturized, thus enabling cost savings and enhancing product competitiveness.

In one aspect, the present invention provides an image sensor module embedded in a mobile phone, including: a rigid-flexible printed circuit board including a component-mounting plating pattern formed on an upper surface of one end thereof and a connector mounted on an upper surface of another end thereof; an image sensor chip mounted on the rigid-flexible printed circuit board such that it is connected to the component-mounting plating pattern formed on the upper surface of the one end of the rigid-flexible printed circuit board, and including another component-mounting plating pattern formed on an upper surface thereof; a device mounted on the image sensor chip such that it is connected to the component-mounting plating pattern formed on the upper surface of the image sensor chip; and a housing disposed on the upper surface of the image sensor chip and having a lens.

The device may be mounted on the image sensor chip around a sensor area of the image sensor chip.

The image sensor chip may be packaged into an LCC (Leadless Chip Carrier) type.

The image sensor chip may be a diced image sensor chip, and is wire bonded to the rigid-flexible printed circuit board.

The device may be a drive integrated circuit to provide a drive control signal to the image sensor chip.

The device may be a multi-layer ceramic condenser to provide charging current to the image sensor chip.

In another aspect, the present invention provides a method of manufacturing an image sensor module embedded in a mobile phone, including: (A) preparing a rigid-flexible printed circuit board, which includes a plating pattern formed on an upper surface of one end thereof and on which an image sensor chip is mounted, and another plating pattern formed on an upper surface of another end thereof and on which a connector is mounted; (B) mounting the image sensor chip and the connector on the respective corresponding plating patterns formed on the upper surface of the rigid-flexible printed circuit board; (C) mounting a device on a corresponding plating pattern formed on an upper surface of the image sensor chip; and (D) attaching a housing having a lens to the upper surface of the image sensor chip.

In mounting the device (C), the device may be mounted around a sensor area of the image sensor chip.

In preparing the rigid-flexible printed circuit board (A), the plating pattern formed on the upper surface of the one end of the rigid-flexible printed circuit board may be configured to enable the image sensor chip packaged into an LCC type of image sensor chip to be mounted thereon, and, in mounting the image sensor chip and the connector (B), the image sensor chip packaged into an LCC type of image sensor module may be mounted on the plating pattern formed on the upper surface of the one end of the rigid-flexible printed circuit board.

In preparing the rigid-flexible printed circuit board (A), the plating pattern formed on the upper surface of the one end of the rigid-flexible printed circuit board may be configured to enable the image sensor chip that is a diced image sensor chip to be mounted thereon, and, in mounting the image sensor chip and the connector (B), the diced image sensor chip may be mounted on and then wire bonded to the plating pattern formed on the upper surface of the one end of the rigid-flexible printed circuit board.

In mounting the device on the corresponding plating pattern formed on the upper surface of the image sensor chip (C), the device may be a drive integrated circuit to provide a drive control signal to the image sensor chip.

In mounting the device on the corresponding plating pattern formed on the upper surface of the image sensor chip (C), the device may be a multi-layer ceramic condenser for providing charge current to the image sensor chip.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, an embodiment of the present invention will be described in greater detail with reference to the following drawings.

Figure 5:
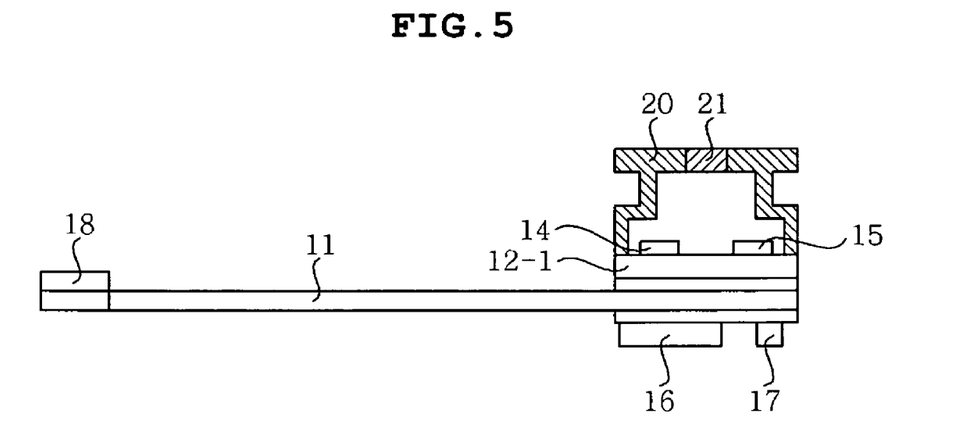
FIG. 5 is a side view schematically showing an image sensor module embedded in a mobile phone, according to an embodiment of the present invention.
Figure 6:
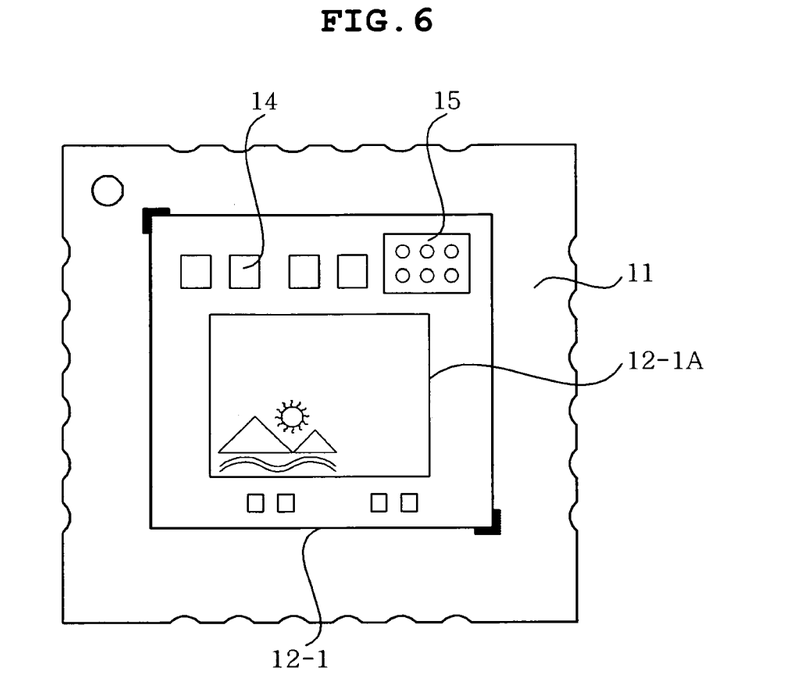
FIG. 6 is a plan view of FIG. 5.
Figure 7:
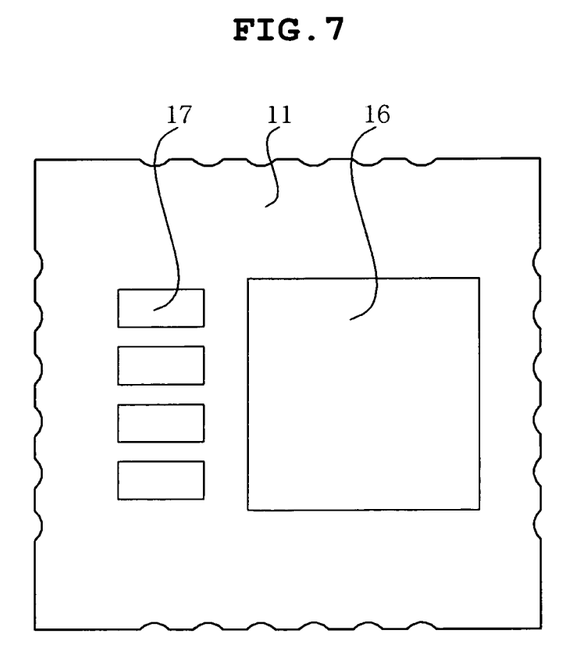
FIG. 7 is a bottom plan view of FIG. 5.

FIG. 5 is a side view schematically showing an image sensor module embedded in a mobile phone according to an embodiment of the present invention, FIG. 6 is a plan view of FIG. 5, and FIG. 7 is a bottom plan view of FIG. 5.

Referring to FIGS. 5 to 7, the image sensor module embedded in a mobile phone according to an embodiment of the present invention is configured such that a rigid part having a high mechanical strength and a flexible part which is freely bendable are integrated together to thus prepare a rigid-flexible printed circuit board 11 which is slightly larger than an image sensor chip 12-1, without requiring the separate manufacture of a printed circuit board and a flexible printed circuit. The image sensor chip 12-1, which is packaged into a leadless chip carrier (LCC) type, is mounted on the rigid part of the rigid-flexible printed circuit board 11 using a flip-chip bonding technology. A memory chip 16 and peripheral chips 17 are mounted on the bottom surface of the rigid-flexible printed circuit board 11, and a connector 18 is formed on the end of the flexible part of the rigid-flexible printed circuit board 11.

As shown in FIG. 6, a multi-layer ceramic condenser 14 and a drive integrated circuit 15 are mounted on a peripheral area around a sensor area 12-1A of the image sensor chip 12-1 mounted on the rigid-flexible printed circuit board 11.

Furthermore, a housing 20 having a lens 21 is attached to the upper surface of the image sensor chip 12-1. In this regard, the upper surface of the image sensor chip 12-1 is composed of glass or an IR-filter.

In this way, the multi-layer ceramic condenser 14 and the drive integrated circuit 15 are positioned on the upper surface of the image sensor chip 12-1, and thus the size of the rigid-flexible printed circuit board 11 is reduced, resulting in an overall size reduction in the image sensor module.

Figure 8:
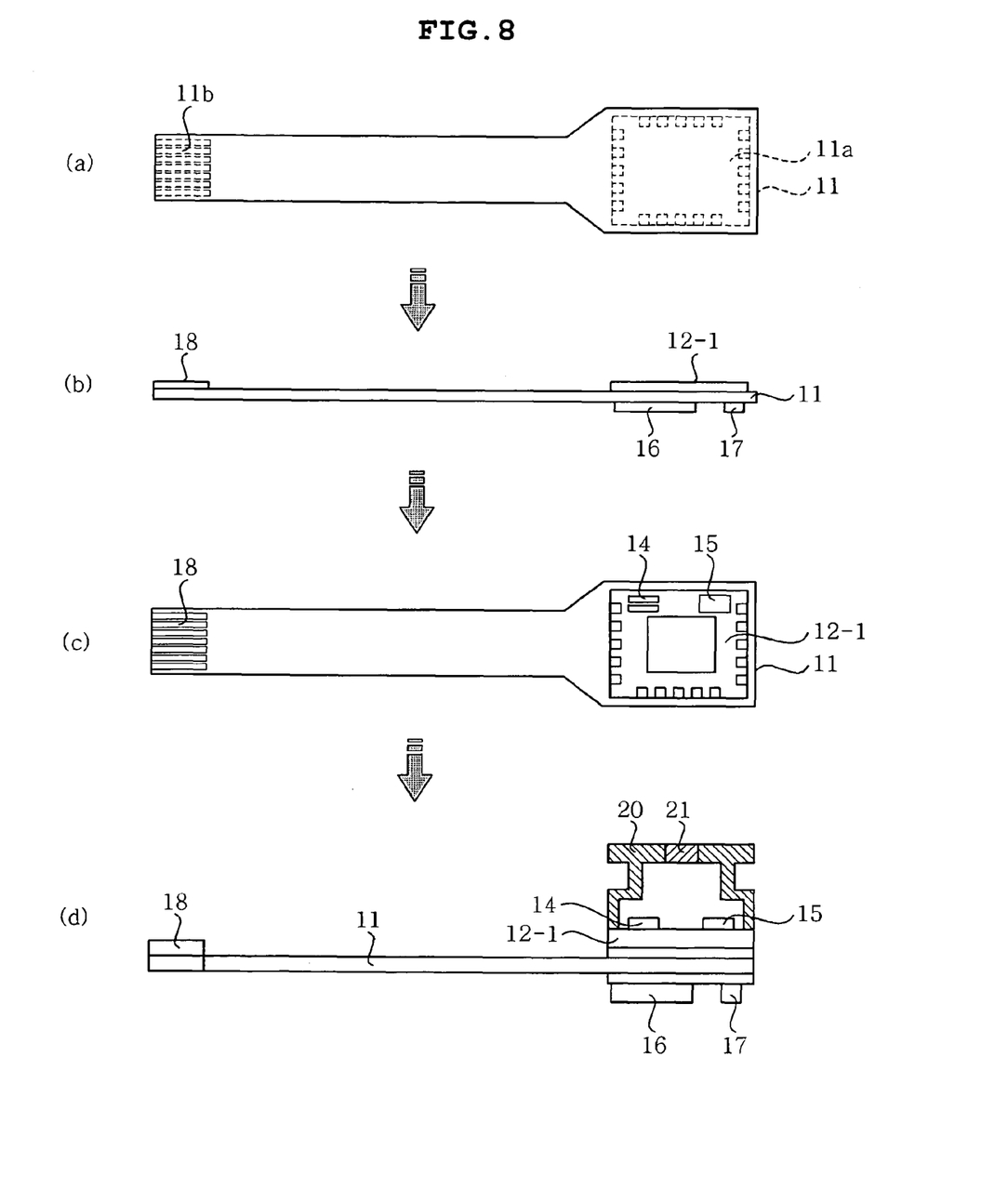
FIG. 8 is a process view showing a process of manufacturing an image sensor module embedded in a mobile phone, according to an embodiment of the present invention.

FIG. 8 is a process view sequentially showing a process of manufacturing an image sensor module embedded in a mobile phone, according to an embodiment of the present invention.

Referring to FIG. 8, in the process of manufacturing an image sensor module embedded in a mobile phone, according to an embodiment of the present invention, a rigid-flexible printed circuit board 11 is first prepared. In the rigid-flexible printed circuit board, a component-mounting plating pattern 11a is formed on the upper surface of one end of the rigid-flexible printed circuit board 11 so that an image sensor chip 12-1, which is packaged into an LCC type, is mounted on the component-mounting plating pattern 11a, and a plating pattern 11b is formed on the other end of the rigid-flexible printed circuit board 11 so that a connector 18 is mounted on the plating pattern 11b.

Subsequently, the image sensor chip 12-1 and the connector 18 are mounted on the respective corresponding plating patterns in a flip-chip bonding manner using surface mount technology (SMT), and a memory chip 16 and peripheral chips 17 are mounted on the rear surface of the rigid-flexible printed circuit board 11 in the same manner using surface mount technology.

Thereafter, a multi-layer ceramic condenser 14 and a drive integrated circuit 15 are attached to the upper surface of the image sensor chip 12-1 using flip-chip bonding technology or through an intervening anisotropic conductive film (ACF) such that the multi-layer ceramic condenser 14 and the drive integrated circuit 15 are electrically connected to the circuit pattern formed on the image sensor chip 12-1.

Finally, a housing 20 having a lens 21 is attached to the upper surface of the image sensor chip 12-1, i.e., to the glass or IR-filter of the image sensor chip 12-1, thus providing the image sensor module.

Figure 9:
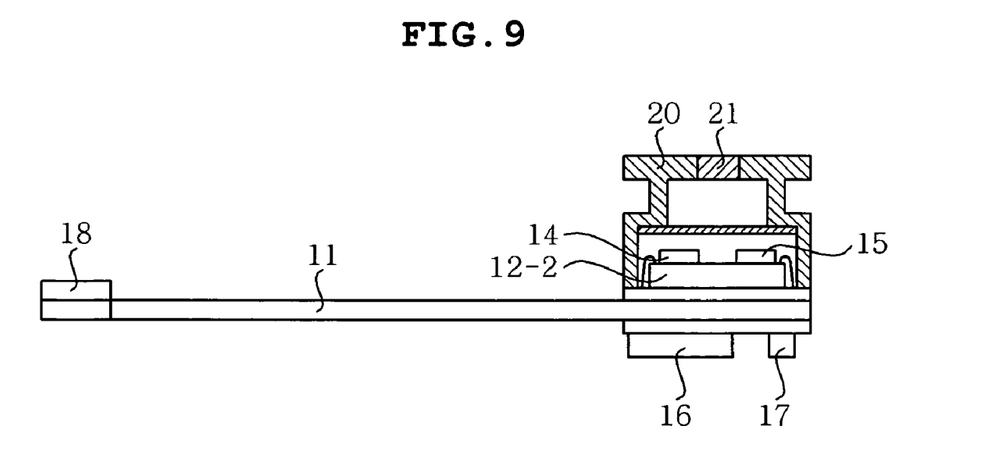
FIG. 9 is a side view schematically showing an image sensor module embedded in a mobile phone, according to another embodiment of the present invention.
Figure 10:
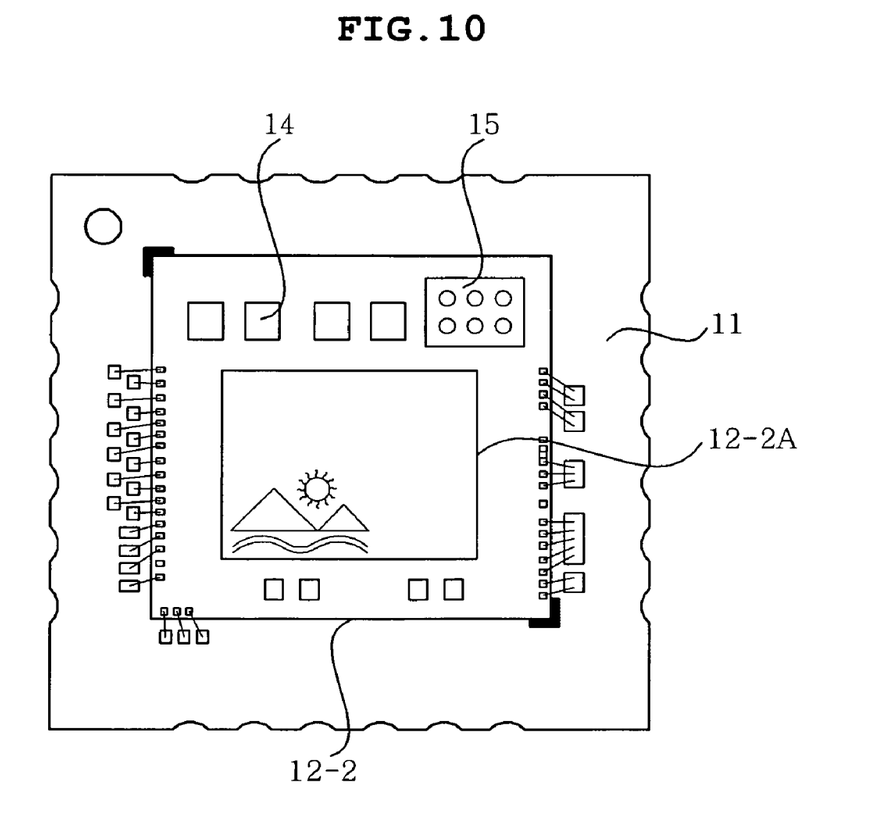
FIG. 10 is a plan view of FIG. 9.

FIG. 9 is a side view showing an image sensor module embedded in a mobile phone according to another embodiment of the present invention, and FIG. 10 is a plan view of FIG. 9.

Referring to FIG. 9, this embodiment of the present invention is differentiated from the above-described previous embodiment of the present invention in that the image sensor chip 12-1, which is packaged into an LCC type, is not used but an image sensor chip 12-2, which is composed of a diced discrete image sensor chip, is used, and the image sensor chip 12-2 and the rigid-flexible printed circuit board 11 are wire bonded after being die bonded.

Figure 11:
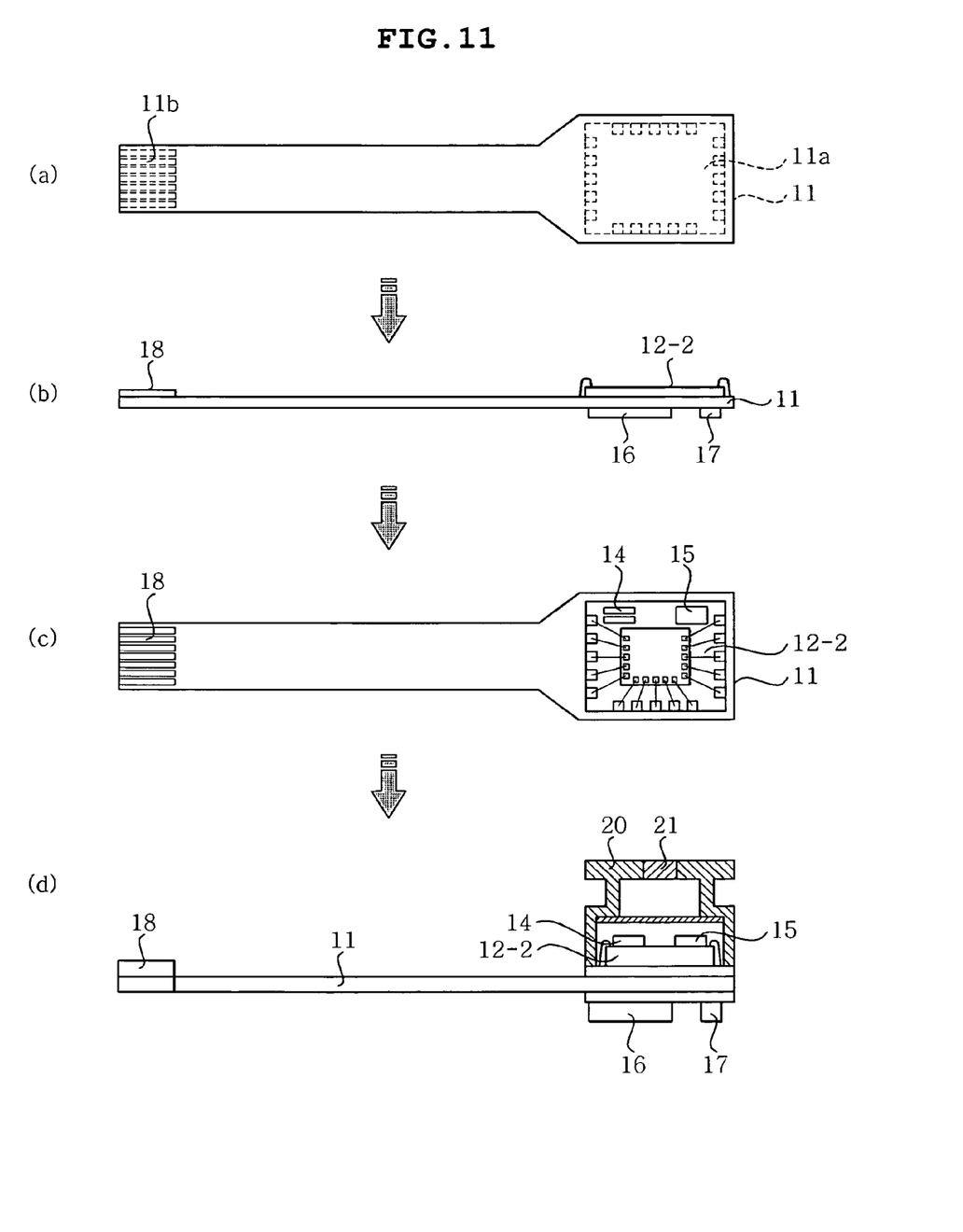
FIG. 11 is a process view showing a process of manufacturing an image sensor module embedded in a mobile phone, according to another embodiment of the present invention.

A process of manufacturing an image sensor module embedded in a mobile phone using a discrete image sensor chip is now described with reference to FIG. 11.

A rigid-flexible printed circuit board 11 is first prepared. In the preparation of the rigid-flexible printed circuit board 11, a component-mounting plating pattern 11a, to which an image sensor chip 12-2 which is prepared from a diced discrete chip, is die bonded and wire bonded and formed on the upper surface of one end of the rigid-flexible printed circuit board 11, while on the upper surface of the other end of the rigid-flexible printed circuit board 11a plating pattern 11b on which a connector 18 will be mounted is formed.

Subsequently, the image sensor chip 12-2 is mounted on the corresponding plating pattern using die bonding, and wire bonding is conducted to guarantee a good electrical connection between the rigid-flexible printed circuit board 11 and the image sensor chip 12-2.

Thereafter, a memory chips 16 and peripheral chips 17 are mounted on the rear surface of the rigid-flexible printed circuit board 11 using surface mount technology.

A multi-layer ceramic condenser 14 and a drive integrated circuit 15 are attached to the upper surface of the image sensor chip 12-2 using flip-chip bonding technology or through an intervening anisotropic conductive film (ACF) such that the multi-layer ceramic condenser 14 and the drive integrated circuit 15 are electrically connected to the circuit pattern formed on the image sensor chip 12-2.

Finally, a housing 20 having a lens 21 is attached to the upper surface of the image sensor chip 12-2, i.e., to the glass or IR-filter of the image sensor chip 12-2, thus providing the completed image sensor module.

As described above, according to the present invention, an image sensor module can be reduced to the size of an image sensor chip.

In addition, according to the present invention, owing to the reduction of the image sensor module to the size of an image sensor chip, cost savings and enhanced product competitiveness are realized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An image sensor module embedded in a mobile phone, comprising:
    a rigid-flexible printed circuit board including a component-mounting plating pattern formed on an upper surface of one end thereof and a connector mounted on an upper surface of another end thereof;
    an image sensor chip mounted on the rigid-flexible printed circuit board such that it is connected to the component-mounting plating pattern formed on the upper surface of the one end of the rigid-flexible printed circuit board, and including a component-mounting plating pattern formed on an upper surface of the image sensor chip;
    a device mounted on the image sensor chip such that it is directly connected to the component-mounting plating pattern formed on the upper surface of the image sensor chip; and
    a housing disposed on the upper surface of the image sensor chip and having a lens.

2. The image sensor module embedded in a mobile phone, according to claim 1, wherein the device is mounted on the image sensor chip around a sensor area of the image sensor chip.

3. The image sensor module embedded in a mobile phone, according to claim 1, wherein the image sensor chip is packaged into an LCC (Leadless Chip Carrier) type.

4. The image sensor module embedded in a mobile phone, according to claim 1, wherein the image sensor chip is a diced image sensor chip, and is wire bonded to the rigid-flexible printed circuit board.

5. The image sensor module embedded in a mobile phone, according to claim 1, wherein the device is a drive integrated circuit to provide a drive control signal to the image sensor chip.

6. The image sensor module embedded in a mobile phone, according to claim 1, wherein the device is a multi-layer ceramic condenser to provide charging current to the image sensor chip.

7. A method of manufacturing an image sensor module embedded in a mobile phone, comprising:
    preparing a rigid-flexible printed circuit board, which includes a plating pattern formed on an upper surface of one end thereof and on which an image sensor chip is mounted, and another plating pattern formed on an upper surface of another end thereof and on which a connector is mounted;
    mounting the image sensor chip and the connector on the respective corresponding plating patterns formed on the upper surface of the rigid-flexible printed circuit board;
    mounting a device to be directly connected to a corresponding plating pattern formed on an upper surface of the image sensor chip; and
    attaching a housing having a lens to the upper surface of the image sensor chip.

8. The method according to claim 7, wherein, in mounting the device, the device is mounted around a sensor area of the image sensor chip.

9. The method according to claim 7, wherein, in preparing the rigid-flexible printed circuit board, the plating pattern formed on the upper surface of the one end of the rigid-flexible printed circuit board is configured to enable the image sensor chip packaged into an LCC type of image sensor chip to be mounted thereon, and, in mounting the image sensor chip and the connector, the image sensor chip packaged into an LCC type of image sensor module is mounted on the plating pattern formed on the upper surface of the one end of the rigid-flexible printed circuit board.

10. The method according to claim 7, wherein, in preparing the rigid-flexible printed circuit board, the plating pattern formed on the upper surface of the one end of the rigid-flexible printed circuit board is configured to enable the image sensor chip that is a diced image sensor chip to be mounted thereon, and, in mounting the image sensor chip and the connector, the diced image sensor chip is mounted on and then wire bonded to the plating pattern formed on the upper surface of the one end of the rigid-flexible printed circuit board.

11. The method according to claim 7, wherein, in mounting the device on the corresponding plating pattern formed on the upper surface of the image sensor chip, the device is a drive integrated circuit to provide a drive control signal to the image sensor chip.

12. The method according to claim 7, wherein, in mounting the device on the corresponding plating pattern formed on the upper surface of the image sensor chip, the device is a multi-layer ceramic condenser for providing charge current to the image sensor chip.

* * * * *